United States Patent Office
2,945,703
Patented July 19, 1960

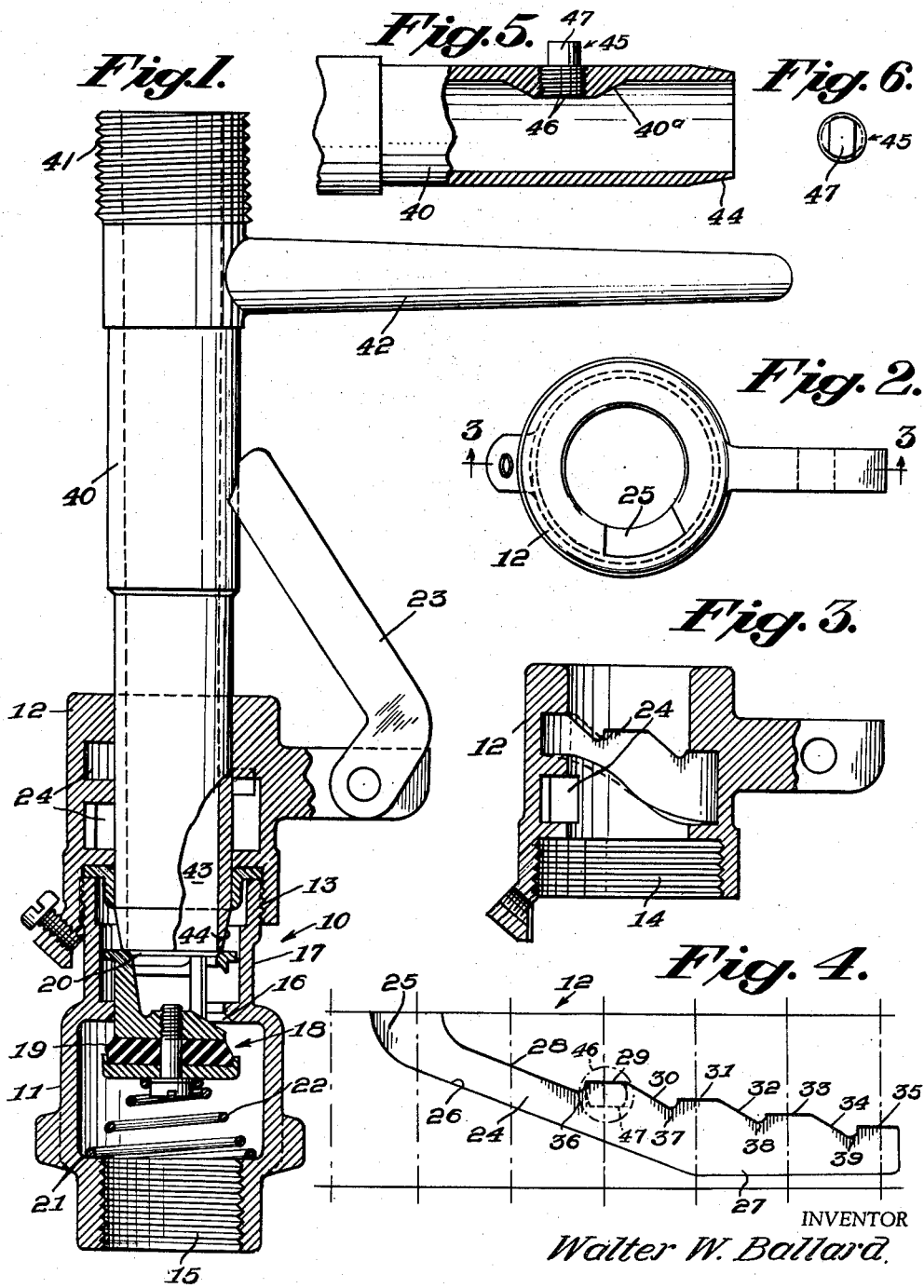

2,945,703

VALVE AND KEY THEREFOR

Walter W. Ballard, % L. R. Nelson Mfg. Co., 1725 S. Washington St., Peoria, Ill.

Filed June 6, 1958, Ser. No. 740,294

2 Claims. (Cl. 284—18)

This invention relates to a valve and a cooperating water flow control key.

The invention is more particularly concerned with sprinkler valves which generally comprise a valve body having a valve seat and a spring urged valve member cooperating with the seat, a cylindrical retainer nut threaded onto the valve body and a water flow control key for adjusting the valve member relative to the seat in opposition to the action of the spring which normally retains the valve member in seated position and wherein the said control key is of tubular formation for passage of water therethrough.

The valve control key is supported within the retainer nut for axial adjustment therein for retaining the valve member in selected adjusted positions relative to the valve seat for corresponding volume flow of water through the valve and the said key whose outer end is threaded for attachment of a hose thereto.

The said axial adjustment of the valve control key has heretofore been effected by cooperating threads on the key and within the retainer nut with a lock assembly to retain the key in any valve adjusted position. The valve adjustment has also heretofore been effected by a key having a laterally projecting lug or lugs on its inner end for cooperation with a thread or spiral groove in the inner wall of the retainer nut and which lugs in some instances were of brass and were cast as a part of the key, while in other instances the lugs have consisted of brass pins extending through both sides of the key or other inner extensions which tend to set up turbulence in the water stream and prevent undisturbed flow of the water when greatest area sprinkling is desired. Such lugs as heretofore used were subject to wear and breakage with a resulting inoperative condition of the valve.

It is accordingly a primary feature of the present invention to provide a valve including a valve body having a valve seat and a valve member normally spring urged into engagement with said seat, together with a tubular retainer nut receiving the inner end of a cylindrical valve control key and wherein said retainer nut is provided with a spiral groove in the inner wall thereof and said key is provided with a novel form of lug movably disposed in said groove whereby the above noted objections to keys heretofore proposed or provided are overcome.

A further novel feature of the invention is the provision of a novel form of lug which is removably secured to the key.

A still further feature of the invention is provision of a novel form of lug guiding groove in the inner wall of said retaining nut whose upper wall is provided with spaced lug engaging shoulders or projections for retaining the key in various adjusted positions.

Other features and advantages of the invention will become apparent in the course of the following detailed description, taken in connection with the accompanying drawing wherein:

Fig. 1 is a view partly in elevation and partly in vertical axial section showing the improved valve and cooperating key in accordance with a preferred structural embodiment of the invention;

Fig. 2 is a top plan view of the retainer nut;

Fig. 3 is a vertical sectional view of the said retainer nut as observed in the plane of line 3—3 on Fig. 2;

Fig. 4 is a diagrammatic view showing a development of the key lug engaging grooves in the inner wall of the retainer nut.

Fig. 5 is a view of the lower end portion of the tubular key with a portion thereof in axial section and showing the lug in elevation;

Fig. 6 is an outer plan view of the improved groove receiving lug.

Referring now in detail to the drawing, the valve is designated in its entirety as 10 and which comprises a valve body 11 and a cylindrical retainer nut 12, the latter being removably engaged with the former by means of respective cooperating threads 13 and 14.

The valve body 11 has a lower threaded opening 15 for detachable connection with a water pipe and the valve body is further provided with a valve seat 16 and includes a cylindrical valve guiding portion 17 above the said seat. A valve 18 is disposed within the body 11 and which includes a lower seat engaging member 19 and an upper key engaging member 20.

The valve body 11 includes a circumferential seat 21 which is engaged by one end of a coil spring 22 whose opposite end reacts on the valve 18 for normally retaining same in closing engagement with the seat 16.

The retainer nut 12 is provided with the usual pivoted and spring urged cover 23. The nut 12 is further provided with a spiral groove 24 which as is more particularly shown in the developed view in Fig. 4 includes a mouth 25 which opens through the upper end of the nut and the bottom wall of the groove is inclined downwardly for a substantial distance as indicated at 26 and for the remainder of the length of the groove the bottom wall 27 thereof is horizontal.

The top wall of the groove includes a downwardly inclined portion 28 adjacent the mouth 25 and the groove beyond the inclined top wall portion 28 is of increased vertical extent between the upper and lower walls thereof with the upper wall thereof including successive horizontal and downwardly inclined portions 29 to 35 as indicated on the drawing and stop shoulders 36 to 39 are provided at the junctions of wall portions 28 to 35 for a purpose later to appear.

A key is provided for controlling valve 18 in opposition to the spring 22 which normally holds the valve in seated position.

The key comprises an elongated tubular water conveying member 40 whose upper end is threaded as at 41 for connection of a hose therewith and same is provided with a manipulating handle 42 as is clearly indicated in Fig. 1. While the key 40 is as shown, of variable external diameters the bore 43 therein is of constant diameter throughout its length with the exception of an internal projection, later referred to.

The lower end of the key 40 is tapered as at 44 and such tapered end engages the upper end of valve 18 and engagement between the valve and lower end of the key will be constant regardless of the adjusted position of the key.

The key 40 comprises a lug 45 which includes a tapered threaded portion 46 and a groove engaging portion 47. The threaded portion 46 is engagd within a thickened portion provided by an internal projection 40ª on the wall of member 40.

As is clearly indicated in Fig. 5, it is to be particularly noted that the internal projection 40ª merges into the wall of the otherwise uniform diameter bore 43 through axially opposed tapered side walls whereby turbulence in the flow of fluid through the bore is avoided.

The tubular key member 40 may be of the usual brass material but the lug 45 is formed of stainless steel or other metal that can be hardened against the usual wear of non-hardened material. The protruding portion 47 of the lug is of elongated form as indicated in Fig. 6 and which in the assembled position of the lug has its major axis disposed in right angular relation to the axis of the tubular member 40.

The use of hardened steel in the lug provides not only for a tight fit with tubular member 40 but the hardness of the hardened steel insures against wear and breakage which was prevalent in prior structures utilizing lugs.

In operation of the valve, the handle 42 is grasped and rotated clockwise which due to the cooperation between the groove 24 and the lug 27 results in the valve 18 being lowered as is indicated in Fig. 1 and upon the lug reaching the successive stop shoulders 36, 37, 38 and 39 the valve will be automatically locked in the respective adjusted positions providing for corresponding volumes of water to pass through the valve, and the tubular key member 40 to the hose.

Since the stop shoulders have downwardly convex walls the key may be turned counterclockwise to reduce the water flow with little effort.

Furthermore, the tapered thread 46 in combination with the flat sides of the lug 47 provides for movement of the lug through the spiral groove without changing the angle of the flat sides, thereby preventing locking of the lug in the spiral groove.

As is indicated by dotted lines in Fig. 4, a flat side of lug 47 engages the successive horizontal upper wall portions 29, 31, 33 and 35 which results in corresponding depressions of the valve 18 and while opposite edges of the lug 47 are curved, the successive stop shoulders will retain the lug in engagement with any one of the said upper wall portions since the tubular member 40 is constantly urged upwardly by the spring 22, and the action of the spring prevents retention of the lug on the inclined portions 30, 32 and 34.

What is claimed is:

1. In a valve structure including a valve body provided with a valve seat, a valve member in said valve body beneath said seat, a spring in said valve body biasing said valve member upwardly toward said seat, a cylindrical retaining nut disposed above and removably connected with said valve body, a tubular key member having one end thereof disposed within said retaining nut and constantly engaging the upper end of said valve member, and a handle projecting from said key member for imparting rotation thereto; the improvement which comprises a spiral groove in the inner wall of said cylindrical retaining nut, said spiral groove having a mouth opening through the upper end of the cylindrical retaining nut, the bottom wall of said groove being uniformly inclined downward from the mouth thereof for a substantial length of the groove and being horizontal for the remaining portion thereof, the upper wall of said groove comprising a portion in spaced parallel relation to said inclined bottom wall, the remainder of said upper wall comprising spaced downwardly facing horizontal seat portions which are disposed at successively greater distances from the upper end of the cylindrical retaining nut, downwardly inclined portions, between the horizontal portions, and convex stop shoulders between the horizontal and inclined portions, and said key member being provided with a lug movable through said groove and being selectively engageable with said horizontal seat portions and said convex stop shoulders, whereby as the key member is advanced downwardly in the groove, the valve member is correspondingly moved downwardly and away from said valve seat, and the valve being retainable in successive positions beneath said valve seat at distances corresponding to the vertical distances between the successive horizontal portions in the said spiral groove for varying the flow of fluid through the valve.

2. The structure according to claim 1, wherein said tubular key member is provided with an internal projection adjacent the lower end thereof with the bore therein being otherwise of uniform diameter throughout the length thereof, a tapered thread in the wall of said key member and said internal projection, said projection merging into the inner wall of said tubular key member through tapered walls whereby to avoid turbulence in the flow of fluid through the tubular key member, and said lug having a tapered threaded portion cooperating with said tapered thread on the wall of said key member and a portion protruding from said tapered threaded portion and being elongated transversely of the axis of the key member and comprising opposite plane parallel side walls and opposite convex end walls, one of said side walls cooperating with one of said horizontal portions of said spiral groove and a convex end wall thereof cooperating with one of said convex stop shoulders in each seated position of the lug, in the spiral groove the threaded engagement of said lug with said key member providing for rotation of the lug about its axis for full contact of a flat wall thereof with the said horizontal and downwardly inclined portions of said upper wall of said groove.

References Cited in the file of this patent

UNITED STATES PATENTS

| 1,150,641 | Smith | Aug. 17, 1915 |
| 1,597,794 | Horsburgh | Aug. 31, 1926 |
| 1,996,900 | Buckner | Apr. 9, 1935 |
| 2,173,295 | Coles | Sept. 19, 1939 |
| 2,218,988 | Johnston | Oct. 22, 1940 |
| 2,278,580 | Coles | Apr. 7, 1942 |
| 2,427,591 | Denison | Sept. 16, 1947 |